(12) United States Patent
Deng et al.

(10) Patent No.: US 12,411,004 B2
(45) Date of Patent: Sep. 9, 2025

(54) THREE-DIMENSIONAL (3D) STRUCTURED LIGHT CAMERA BASED METHOD AND SYSTEM FOR MEASURING GAP OF VEHICLE BODY

(71) Applicant: SpeedBot Robotics Co., Ltd., Changsha (CN)

(72) Inventors: Junjie Deng, Changsha (CN); Qing Li, Changsha (CN)

(73) Assignee: SpeedBot Robotics Co., Ltd., Changsha (CN)

( * ) Notice: Subject to any disclaimer, the term of this patent is extended or adjusted under 35 U.S.C. 154(b) by 439 days.

(21) Appl. No.: 17/974,561

(22) Filed: Oct. 27, 2022

(65) Prior Publication Data
US 2023/0258445 A1     Aug. 17, 2023

(30) Foreign Application Priority Data

Feb. 17, 2022   (CN) .......................... 202210148097.5

(51) Int. Cl.
| | |
|---|---|
| *G01B 11/14* | (2006.01) |
| *G06F 18/23* | (2023.01) |
| *G06T 7/00* | (2017.01) |
| *G06T 7/73* | (2017.01) |

(52) U.S. Cl.
CPC .............. *G01B 11/14* (2013.01); *G06F 18/23* (2023.01); *G06T 7/0004* (2013.01); *G06T 7/73* (2017.01); *G06T 2207/10028* (2013.01); *G06T 2207/30252* (2013.01)

(58) Field of Classification Search
CPC ..... G01B 11/14; G01B 11/2518; G06F 18/23; G06T 7/0004; G06T 7/73; G06T 2207/10028; G06T 2207/30252; G06T 7/12; G06T 7/60; G06T 2207/20076; G06T 2207/30164; G06T 2207/30248; Y02T 10/40
USPC ......................................................... 382/154
See application file for complete search history.

(56) References Cited

FOREIGN PATENT DOCUMENTS

| CN | 214565917 | * | 11/2021 | |
|---|---|---|---|---|
| EP | 0529558 | * | 3/1993 | .............. G01S 11/12 |
| JP | 2007147608 | * | 6/2007 | ........... B60Q 1/0023 |

* cited by examiner

*Primary Examiner* — Jerome Grant, II

(57) ABSTRACT

A three-dimensional (3D) structured light camera based method and system for measuring a gap of a vehicle body is provided. The method includes: obtaining point cloud data obtained by a 3D structured light camera scanning the gap of the measured vehicle body; with a group of point cloud data of the gap of the measured vehicle body in a transverse direction as a contour, extracting contour gap points of each contour, so as to obtain a left side contour gap point set $N_0$ and a right side contour gap point set $N_1$; computing a mean distance vector $\vec{\tau}$ between contours on two sides of the gap of the measured vehicle body according to the left side contour gap point set $N_0$ and the right side contour gap point set $N_1$; and computing the gap d of the measured vehicle body according to the mean distance vector $\vec{\tau}$.

18 Claims, 5 Drawing Sheets

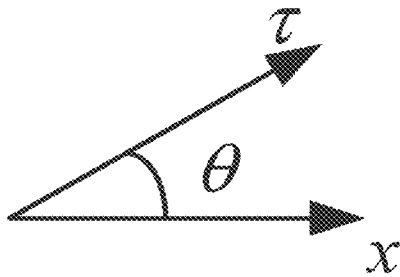

FIG. 5

Find a contour gap point corresponding to an x-axis minimum value from the left side contour gap point set N₀, find a contour gap point corresponding to an x-axis maximum value from the right side contour gap point set N₁, and mark a region of interest (ROI) with the contour gap point corresponding to the x-axis minimum value and the contour gap point corresponding to the x-axis maximum value as reference points

↓

Obtain contour gap points belonging to the ROI in the left side contour gap point set N₀ and the right side contour gap point set N₁ to obtain a surface difference point cloud set

↓

Extract planes on the basis of the surface difference point cloud set to obtain a left side plane and a right side plane

↓

With one side plane as a reference plane, solve a center of mass of the other side plane as a measurement point, so as to compute a distance between the measurement point and the reference plane as a surface difference computation result of the gap of the measured vehicle body

FIG. 6

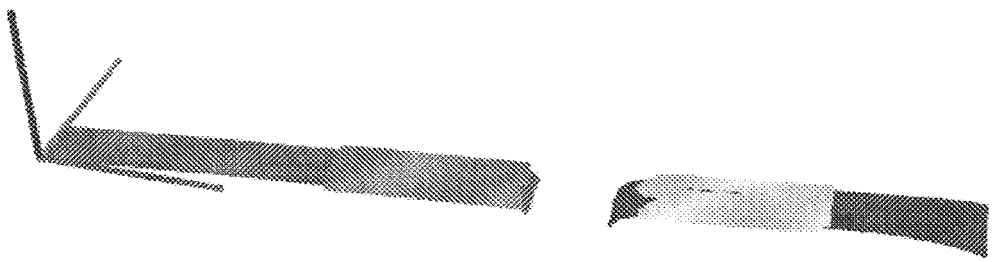

FIG. 7

THREE-DIMENSIONAL (3D) STRUCTURED LIGHT CAMERA BASED METHOD AND SYSTEM FOR MEASURING GAP OF VEHICLE BODY

CROSS REFERENCE TO THE RELATED APPLICATIONS

This application is based upon and claims priority to Chinese Patent Application No. 202210148097.5, filed on Feb. 17, 2022, the entire contents of which are incorporated herein by reference.

TECHNICAL FIELD

The present disclosure relates to a vehicle body gap surface difference measurement technology for an automobile, and in particular to a three-dimensional (3D) structured light camera based method and system for measuring a gap of a vehicle body.

BACKGROUND ART

In the process of welding and assembling automobile parts, it is necessary to measure and control gaps and surface differences of a plurality of parts (e.g., doors, frame, trunk lid, windows, glass, etc.) of the vehicle body due to subsequent assembly requirements or product appearance requirements.

Presently, a tool for measuring a gap and a surface difference of a vehicle body of an automobile mainly includes a gap gauge and a surface difference meter, of which the measurement mode is that measurement personnel hold the tool for measurement. However, such a manual measurement mode has the defects that the beat is slow, and the measurement result is greatly influenced by the measurement angle and the measurement position, influencing the accuracy and objectivity of the measurement result. Presently, an increasing number of automobile companies start to seek a gap and surface difference measurement solution replacing manual measurement, so as to improve the automation degree of the production line and optimize human resource configuration.

The development of the visual system provides the desirable solution to the pain points and demands above. Presently, there are a multi-view vision based measurement system and a laser scanner based measurement system. The multi-view vision based measurement system utilizes a plurality of two-dimensional (2D) cameras at different point positions to reconstruct a workpiece to be measured, but such a mode has low precision and large measurement deviation, and sometimes the requirements are difficult to satisfy. The precision of the three-dimensional (3D) line structured light camera can reach the micron level, and the 3D structured light camera based visual system has smaller measurement deviation. Presently, some of 3D line structured light based visual systems only scan a contour at a position to be measured to extract a gap feature point and a surface difference feature point, and computes the gap and the surface difference of the point position according to the gap feature point and the surface difference feature point. The surface difference to be measured is not two perfect planes and the gap to be measured is not completely parallel, and accordingly, the measurement error can be amplified due to the surface quality of the workpiece in the measurement mode that only one contour is taken. Moreover, the method has high positioning requirement on the workpiece to be measured, and it is difficult to be compatible with workpiece positioning deviation.

SUMMARY

Technical problem to be solved by the present disclosure: aiming at the above problem of the prior art, the present disclosure provides a three-dimensional (3D) structured light camera based method and system for measuring a gap of a vehicle body. The present disclosure does not require laser to be perpendicular to a direction of the gap during mounting of a 3D line structured light camera, has better adaptability, may automatically compute a mean distance vector $\vec{\tau}$ between contours on two sides of the gap of the measured vehicle body and the gap d of the measured vehicle body, and has high computation accuracy.

In order to solve the above technical problem, the technical solution used by the present disclosure is as follows:
  a 3D structured light camera based method for measuring a gap of a vehicle body includes:
  1) obtaining point cloud data obtained by a 3D structured light camera scanning the gap of the measured vehicle body;
  2) with a group of point cloud data of the gap of the measured vehicle body in a transverse direction as a contour, extracting contour gap points of each of contours, so as to obtain a left side contour gap point set $N_0$ and a right side contour gap point set $N_1$;
  3) computing a mean distance vector $\vec{\tau}$ between contours on two sides of the gap of the measured vehicle body according to the left side contour gap point set $N_0$ and the right side contour gap point set $N_1$; and
  4) computing the gap d of the measured vehicle body according to the mean distance vector $\vec{\tau}$.

Optionally, the 3D structured light camera in step 1) is a 3D line structured light camera or a 3D surface structured light camera; and when the 3D structured light camera is the 3D line structured light camera, the scanning the gap of the measured vehicle body by the 3D structured light camera refers to longitudinal scanning along the gap of the measured vehicle body, such that each frame of point cloud data of the 3D structured light camera includes a contour.

Optionally, step 2) includes:
  2.1) clustering the point cloud data to obtain a left side cluster point cloud set and a right side cluster point cloud set;
  2.2) carrying out traversal from the left side cluster point cloud set and the right side cluster point cloud set to take a contour as a current contour with a group of point cloud data of the gap of the measured vehicle body in the transverse direction as a contour, and under the condition that traversal succeeds, skipping to a next step; and under the condition that traversal fails, determining that the left side cluster point cloud set and the right side cluster point cloud set have been completely traversed, returning to the left side contour gap point set $N_0$ and the right side contour gap point set $N_1$, and skipping to step 3); and
  2.3) positioning contour gap points in the current contour, under the condition that the current contour is a contour in the left side cluster point cloud set, adding the contour gap points of the current contour into the left side contour gap point set $N_0$, and under the condition that the current contour is a contour in the right side cluster point cloud set, adding the contour gap points of the current contour into the right side contour gap point set $N_1$, and skipping to step 2.2).

Optionally, finding the contour gap points of the current contour in step 2.3) includes: computing a cosine curvature of each of the points on the current contour, and taking the point having the maximum cosine curvature in the current contour as the contour gap point of the current contour.

Optionally, before the extracting contour gap points of each of contours in step 2), the method further includes: filtering discrete point clouds of each of the contours in the point cloud data; and after step 2) and before step 3), the method further includes: fitting straight lines on the left side contour gap point set $N_0$ and the right side contour gap point set $N_1$ respectively to obtain straight lines $L_0$ and $L_1$, and deleting discrete contour gap points in the left side contour gap point set $N_0$ and the right side contour gap point set $N_1$ according to the straight lines $L_0$ and $L_1$.

Optionally, step 3) includes: traversing each of the contour gap points $q_i$ in the left side contour gap point set $N_0$, searching the contour gap points $p_i$ closest to the contour gap points $q_i$ in the right side contour gap point set $N_1$ as the closest contour gap point pairs for the contour gap points $q_i$ obtained by traversing, and computing mean distance vectors of the closest contour gap point pairs; and finally, averaging the mean distance vectors of all the closest contour gap point pairs to obtain the mean distance vector $\vec{\tau}$ between the contours on the two sides of the gap of the measured vehicle body.

Optionally, a function expression of the gap d of the measured vehicle body computed according to the mean distance vector $\vec{\tau}$ in step 4) is:

$$d = |\vec{\tau}| \cos \theta,$$

where $\vec{\tau}$ is the mean distance vector between the contours on the two sides of the gap of the measured vehicle body, θ is an included angle between the mean distance vector $\vec{\tau}$ between the contours on the two sides of the gap of the measured vehicle body after being projected to an xz plane and an x-axis direction, the x-axis direction is a direction perpendicular to the gap, a y-axis direction is a direction parallel to the gap, and a z-axis direction is perpendicular to a direction that the gap faces.

Optionally, after step 2), the method further includes: computing a surface difference of the gap of the measured vehicle body: S1) finding a contour gap point corresponding to an x-axis minimum value from the left side contour gap point set $N_0$, finding a contour gap point corresponding to an x-axis maximum value from the right side contour gap point set $N_1$, and marking a region of interest (ROI) with the contour gap point corresponding to the x-axis minimum value and the contour gap point corresponding to the x-axis maximum value as reference points; and S2) obtaining contour gap points belonging to the ROI in the left side contour gap point set $N_0$ and the right side contour gap point set $N_1$ to obtain a surface difference point cloud set, and extracting planes on the basis of the surface difference point cloud set to obtain a left side plane and a right side plane respectively; and for the obtained left side plane and the obtained right side plane, with one side plane as a reference plane, solving a center of mass of the other side plane as a measurement point, so as to compute a distance between the measurement point and the reference plane as a surface difference computation result of the gap of the measured vehicle body.

Moreover, the present disclosure further provides a 3D structured light camera based system for measuring a gap of a vehicle body. The system includes a microprocessor and a memory connected to each other, where the microprocessor is programmed or configured to execute the steps of the 3D structured light camera based method for measuring a gap of a vehicle body.

Moreover, the present disclosure further provides a computer readable storage medium. The computer readable storage medium stores a computer program, and the computer program is used for being executed by a computer device to implement the steps of the 3D structured light camera based method for measuring a gap of a vehicle body.

Compared with the prior art, the present disclosure mainly has the following advantages:

1. the method includes: computing the mean distance vector $\vec{\tau}$ between the contours on the two sides of the gap of the measured vehicle body according to the left side contour gap point set $N_0$ and the right side contour gap point set $N_1$, and computing the gap d of the measured vehicle body according to the mean distance vector $\vec{\tau}$, and therefore, when the 3D line structured light camera is mounted, it is unnecessary to ensure that laser is perpendicular to a direction of the gap and to spend a large amount of time to adjust relative positions of the laser and the gap, such that a large amount of mounting and adjusting time is saved, and adaptability is better; and 2. the method includes: computing the mean distance vector $\vec{\tau}$ between the contours on the two sides of the gap of the measured vehicle body according to the left side contour gap point set $N_0$ and the right side contour gap point set $N_1$, and computing the gap d of the measured vehicle body according to the mean distance vector $\vec{\tau}$, and may automatically compute the mean distance vector $\vec{\tau}$ between the contours on the two sides of the gap of the measured vehicle body and the gap d of the measured vehicle body, thereby having high computation accuracy, and improving accuracy of gap measurement.

BRIEF DESCRIPTION OF THE DRAWINGS

FIG. 5 is a schematic diagram of 6 in embodiment 1 of the present disclosure.

FIG. 6 is a schematic diagram of a surface difference measurement flow further included in Embodiment 2 of the present disclosure.

FIG. 7 is a planar schematic diagram of a surface difference extracted in Embodiment 2 of the present disclosure.

DETAILED DESCRIPTION OF THE EMBODIMENTS

Embodiment 1

Figure 1:
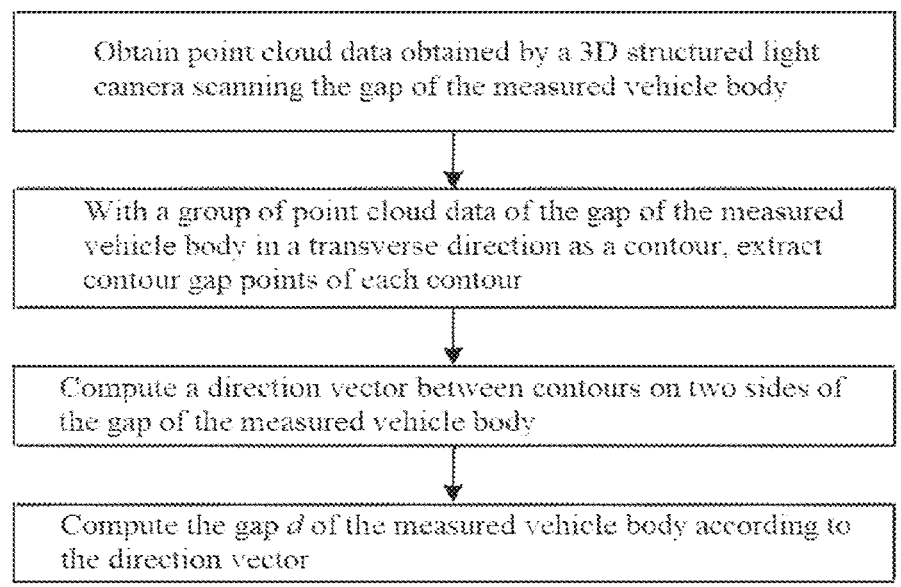
FIG. 1 is a schematic diagram of a basic flow of a method of Embodiment 1 of the present disclosure.
Figure 8:
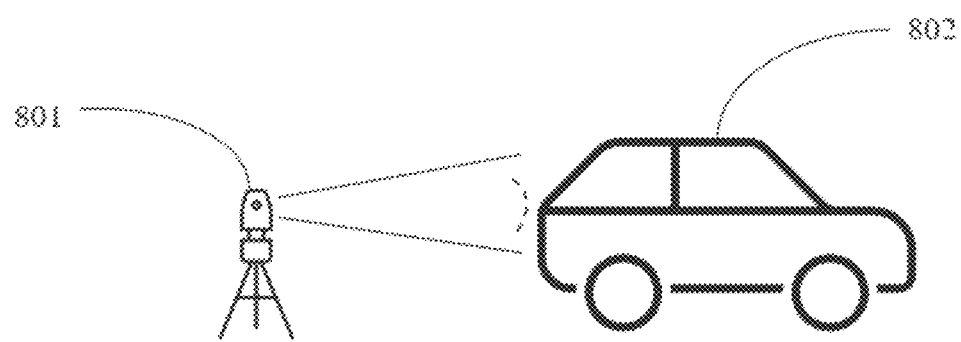
FIG. 8 is a schematic diagram showing a 3D structured light camera and a vehicle body according to embodiments of the present disclosure.

As shown in FIG. 1, a three-dimensional (3D) structured light camera based method for measuring a gap of a vehicle body of an embodiment includes:

1) obtain point cloud data obtained by a 3D structured light camera scanning the gap of the measured vehicle body; the 3D structured light camera 801 and the vehicle body 802 are shown in FIG. 8;
2) with a group of point cloud data of the gap of the measured vehicle body in a transverse direction as a contour, extract contour gap points of each of contours, so as to obtain a left side contour gap point set $N_0$ and a right side contour gap point set $N_1$, where it is to be noted that a left side and a right side herein are merely meant to represent distinction of relative positions of two sides of the gap, may also be referred to as a first side or a second side, an upper side or a lower side, etc. as required, and may be referred to different titles due to different orientations of the gap, but different titles should be equivalent in nature;
3) compute a mean distance vector $\vec{\tau}$ between contours on two sides of the gap of the measured vehicle body according to the left side contour gap point set $N_0$ and the right side contour gap point set $N_1$; and
4) compute the gap d of the measured vehicle body according to the mean distance vector $\vec{\tau}$.

In this embodiment, the 3D structured light camera in step 1) is a 3D line structured light camera, and the scanning the gap of the measured vehicle body by the 3D structured light camera refers to longitudinal scanning along the gap of the measured vehicle body, such that each frame of point cloud data of the 3D structured light camera includes a contour.

Figure 2A:
FIGS. 2A and 2B are schematic diagrams of comparison before and after discrete point clouds are filtered in Embodiment 1 of the present disclosure.
Figure 2B:

Interferences in the form of discrete point clouds, etc. tend to exist in the contour, and these interferences may affect accuracy of measuring the gap of the vehicle body. In order to eliminate the interferences of measuring the gap of the vehicle body and improve accuracy of measuring the gap of the vehicle body, before the extracting contour gap points of each of contours in step 2), the method further includes: filtering discrete point clouds of each of the contours in the point cloud data. FIG. 2A is an original contour, in which interferences in the form of discrete point clouds, etc. may be seen; and FIG. 2B is a contour after the discrete point clouds are filtered, from which it may be seen that the discrete point clouds gave been filtered.

In this embodiment, step 2) includes:

2.1) cluster the point cloud data to obtain a left side cluster point cloud set and a right side cluster point cloud set;
2.2) carry out traversal from the left side cluster point cloud set and the right side cluster point cloud set to take a contour as a current contour with a group of point cloud data of the gap of the measured vehicle body in the transverse direction as a contour (i.e., each frame of point cloud data of the 3D structured light camera), and under the condition that traversal succeeds, skip to a next step; and under the condition that traversal fails, determine that the left side cluster point cloud set and the right side cluster point cloud set have been completely traversed, return to the left side contour gap point set $N_0$ and the right side contour gap point set $N_1$, and skip to step 3); and
2.3) position contour gap points in the current contour, under the condition that the current contour is a contour in the left side cluster point cloud set, add the contour gap points of the current contour into the left side contour gap point set $N_0$, and under the condition that the current contour is a contour in the right side cluster point cloud set, add the contour gap points of the current contour into the right side contour gap point set $N_1$, and skip to step 2.2).

Figure 3A:
FIGS. 3A and 3B are schematic diagrams of a result of contour gap point extraction in Embodiment 1 of the present disclosure.

The left side contour gap point set $N_0$ and the right side contour gap point set $N_1$ may be finally obtained by circularly processing all the contours. FIG. 3A is a schematic diagram of contour gap points extracted from a contour; and FIG. 3B is a schematic diagram of contour gap points extracted from all contours, i.e., a schematic diagram of the left side contour gap point set $N_0$ and the right side contour gap point set $N_1$.

The contour gap points extracted from the contours may be subjected to image identification according to shape features of the contour gap points. For example, as an optional implementation, finding the contour gap points of the current contour in step 2.3) in this embodiment includes: computing a cosine curvature of each of the points on the current contour, and taking the point having the maximum cosine curvature in the current contour as the contour gap point of the current contour, and the use of the cosine curvature computation has the advantages of simple computation and high accuracy.

Figure 3B:

An ideal edge of the gap of the vehicle body should be a straight line, but an actual edge is shown in FIG. 3B, and there are be outliers or other interference points at the edge of the gap of the vehicle body, such that the edge of the gap of the vehicle body is not smooth. In order to solve the above problem, in this embodiment, after step 2) and before step 3), the method further includes: fit straight lines on the left side contour gap point set $N_0$ and the right side contour gap point set $N_1$ respectively to obtain straight lines $L_0$ and $L_1$, and delete discrete contour gap points in the left side contour gap point set $N_0$ and the right side contour gap point set $N_1$ according to the straight lines $L_0$ and $L_1$. By means of the above manner, interferences (interference edge points) of interference contour gap points and discrete contour gap points may be removed, such that an edge of the gap of the vehicle body is smooth, and robustness of the method of this embodiment may be improved.

The fitting straight lines on the left side contour gap point set $N_0$ and the right side contour gap point set $N_1$ respectively to obtain straight lines $L_0$ and $L_1$ refers to that the straight line is fitted on the left side contour gap point set $N_0$ to obtain the straight line $L_0$, and the straight line is fitted on the right side contour gap point set $N_1$ to obtain the straight line $L_1$, where straight line fitting may use an existing fitting algorithm according to needs, for example, as an optional implementation, this embodiment uses a random sample consensus (RANSAC) algorithm to carry out straight line fitting, so as to remove interference edge points and improve robustness of the algorithm; and however, the method of this embodiment does not rely on some particular straight line fitting algorithm, including the RANSAC algorithm.

Figure 4:
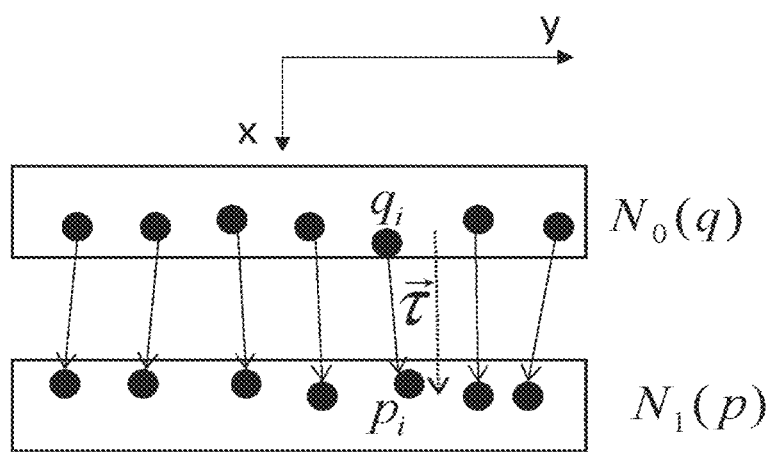
FIG. 4 is a schematic diagram of a computation principle of a mean distance vector in Embodiment 1 of the present disclosure.

After the straight lines are fitted on the left side contour gap point set $N_0$ and the right side contour gap point set $N_1$ to obtain the straight lines $L_0$ and $L_1$, due to vehicle body manufacturing process errors and camera data acquisition errors, the straight lines $L_0$ and $L_1$ are not ideal parallel straight lines, and a point-to-line distance may not be directly used as the gap. In order to compute the mean distance vector $\vec{\tau}$ between the contours on the two sides of the gap of the measured vehicle body, normal vectors of the straight lines $L_0$ and $L_1$ are computed in an automatic neighbor point search manner to serve as the mean distance vector $\vec{\tau}$ between the contours on the two sides of the gap of the measured vehicle body. Specifically, step 3) includes: search the contour gap points $p_i$ closest to the contour gap points $q_i$ in the right side contour gap point set $N_1$ as the closest contour gap point pairs for each of the contour gap points $q_i$ in the left side contour gap point set $N_0$, and compute mean distance vectors of the closest contour gap point pairs, where as shown in FIG. 4, $N_0(q)$ represents the left side contour gap point set $N_0$ composed of the contour gap points q, and $N_1(p)$ represents the right side contour gap point set $N_1$ composed of the contour gap points p; and finally, average the mean distance vectors of all the closest contour gap point pairs to obtain the mean distance vector $\vec{\tau}$ between the contours on the two sides of the gap of the measured vehicle body.

When the gap d of the measured vehicle body is computed, a height difference between the straight lines $L_0$ and $L_1$ needs to be considered, and a minimum gap is computed when a gap ruler is used for manual measurement, and therefore, a function expression of the gap d of the measured vehicle body computed according to the mean distance vector $\vec{\tau}$ in step 4) in this embodiment is:

$$d=|\vec{\tau}|\cos\theta,$$

where $\vec{\tau}$ is the mean distance vector between the contours on the two sides of the gap of the measured vehicle body, θ is an included angle between the mean distance vector $\vec{\tau}$ between the contours on the two sides of the gap of the measured vehicle body after being projected to an xz plane and an x-axis direction, the x-axis direction is a direction perpendicular to the gap, a y-axis direction is a direction parallel to the gap, and a z-axis direction is perpendicular to a direction that the gap faces.

Usually, when the 3D line structured light camera is used to measure the gap of the vehicle body, it is necessary to ensure that the laser is perpendicular to a gap direction vector, such that the gap may be measured, and otherwise, the measured gap is not a real gap. In the method of this embodiment, after a point cloud of the gap is scanned, the closest neighbor point is automatically matched according to the feature point to compute the gap direction vector, and moreover, offset of the vector in an X direction is compensated to compute a true value of the gap d of the measured vehicle body. The method does not need to spend a lot of time on adjusting relative positions of the laser and the gap during camera mounting, such that a lot of mounting and adjusting time is saved, and accuracy of gap measurement is improved at same time.

Figure 9:
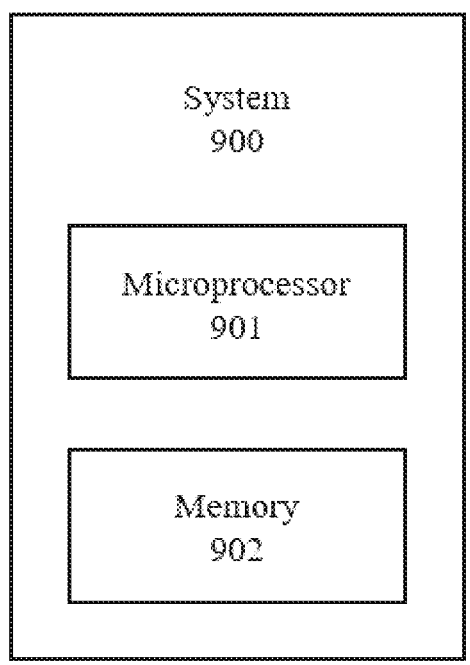
FIG. 9 is a schematic diagram of a 3D structured light camera based system for measuring a gap of a vehicle body according to embodiments of the present disclosure.

Moreover, this embodiment further provides a 3D structured light camera based system 900 (as shown in FIG. 9) for measuring a gap of a vehicle body. The system 900 includes a microprocessor 901 and a memory 902 connected to each other, where the microprocessor 901 is programmed or configured to execute the steps of the above 3D structured light camera based method for measuring a gap of a vehicle body.

Figure 10:
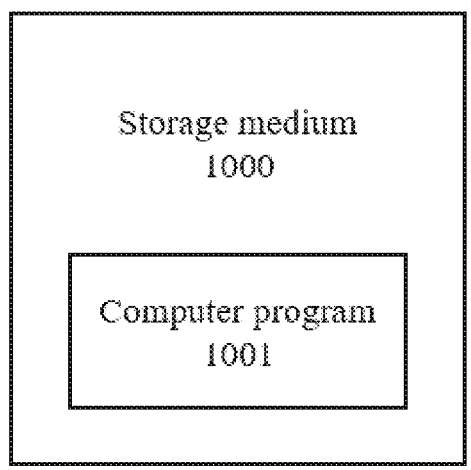
FIG. 10 is a schematic diagram of a computer readable storage medium according to embodiments of the present disclosure.

Moreover, this embodiment further provides a computer readable storage medium 1000 as shown in FIG. 10. The computer readable storage medium 1000 stores a computer program 1001, and the computer program 1001 is used for being executed by a computer device to implement the steps of the above 3D structured light camera based method for measuring a gap of a vehicle body.

Embodiment 2

This embodiment is a further expansion of Embodiment 1, Embodiment 1 only has a function of measuring a gap d of a measured vehicle body, and this embodiment further has a function of measuring a surface difference of the gap of the measured vehicle body. As shown in FIG. 6, after step 2) in Embodiment 1, this embodiment further includes: compute a surface difference of the gap of the measured vehicle body:

S1) find a contour gap point corresponding to an x-axis minimum value from the left side contour gap point set $N_0$, find a contour gap point corresponding to an x-axis maximum value from the right side contour gap point set $N_1$, and mark a region of interest (ROI) with the contour gap point corresponding to the x-axis minimum value and the contour gap point corresponding to the x-axis maximum value as reference points; and S2) obtain contour gap points belonging to the ROI in the left side contour gap point set $N_0$ and the right side contour gap point set $N_1$ to obtain a surface difference point cloud set, and extract planes on the basis of the surface difference point cloud set to obtain a left side plane and a right side plane respectively; and for the obtained left side plane and the obtained right side plane, with one side plane as a reference plane, solve a center of mass of the other side plane as a measurement point, so as to compute a distance between the measurement point and the reference plane as a surface difference computation result of the gap of the measured vehicle body.

The planes are extracted on the basis of the surface difference point cloud set, various existing plane fitting algorithms may be used according to needs, for example, as an optional implementation, a plane is fitted by means of a random sample consensus (RANSAC) algorithm in this embodiment, and moreover, other plane fitting algorithms may further be used according to needs, and the method in this embodiment does not depend on a specific plane fitting algorithm. In this embodiment, the planes are extracted on the basis of the surface difference point cloud set to obtain the left side surface and the right side plane respectively, which is shown in FIG. 7. Finally, aiming at the obtained left side plane and the obtained right side plane, with one side plane as a reference plane, the center of mass of the other side plane is solved as the measurement point, and the distance between the measurement point and the reference plane is computed as the surface difference computation result of the gap of the measured vehicle body.

The difficulty during surface difference computation lies in selection of the reference plane and the measurement point, and in order to accurately select the reference plane and the measurement point, a traditional method for computing a surface difference of a gap of a measured vehicle body needs to accurately position a vehicle. The method of this embodiment does not need to accurately position the vehicle, may automatically find feature points from the left side contour gap point set $N_0$ and the right side contour gap point set $N_1$, and mark the ROI, and moreover, selects the plane as the reference plane and the center of mass as the reference point, and takes a point-to-surface distance as a surface difference value in combination with a surface difference ruler measurement process. Therefore, as long as the gap is within the field of view of the camera, it is unnecessary to accurately position a position of the vehicle body, and as long as the feature points of the gap are obtained, the effect of accurately computing the surface difference value may be achieved.

Moreover, this embodiment further provides a 3D structured light camera based system 900 (as shown in FIG. 9) for measuring a gap of a vehicle body. The system 900 includes a microprocessor 901 and a memory 902 connected to each other, where the microprocessor 901 is programmed or configured to execute the steps of the above 3D structured light camera based method for measuring a gap of a vehicle body.

Moreover, this embodiment further provides a computer readable storage medium 1000 as shown in FIG. 10. The computer readable storage medium 1000 stores a computer program 1001, and the computer program 1001 is used for being executed by a computer device to implement the steps of the above 3D structured light camera based method for measuring a gap of a vehicle body.

Embodiment 3

This embodiment is basically the same as Embodiment 1, and a main difference between this embodiment and Embodiment 1 is that a 3D structured light camera in Embodiment 1 is a 3D line structured light camera, and a 3D structured light camera in this embodiment is a 3D surface structured light camera. A difference between the 3D surface structured light camera and the 3D line structured light camera lies in that frame-by-frame scanning is not needed, and therefore, a frame of point cloud data may not be simply selected as the contour when a group of point cloud data of the gap of the measured vehicle body in a transverse direction is taken as the contour in step 2). A group of point cloud data of the gap of the measured vehicle body in the transverse direction needs to be obtained according to coordinates of the point cloud data to serve as the contour. For example, when an X axis of the 3D surface structured light camera is transversely parallel to the gap of the measured vehicle body, a column of point cloud data of the X axis may be directly selected as the contour; when a Y axis of the 3D surface structured light camera is transversely parallel to the gap of the measured vehicle body, a column of point cloud data of the Y axis may be directly selected as the contour; and when a certain angle is transversely kept between the X axis of the 3D surface structured light camera and the gap of the measured vehicle body, a required selected light point may be computed according to the angle, and therefore, a specific mounting position of the 3D surface structured light camera may be independent.

Those skilled in the art should understand that the embodiments of the present application may be provided as methods, systems, or computer program products. Therefore, the present application may use full hardware embodiments, full software embodiments, or software and hardware combined embodiments. Moreover, the present application may take the form of a computer program product implemented on one or more computer readable storage media (including, but not limited to, disk memories, compact disc read-only memories (CD-ROMs), optical memories, etc.) including computer usable program codes. The present application is described with reference to flowcharts and/or block diagrams of methods, devices (systems), and computer program products according to the embodiments of the present application. It should be understood that each flow and/or block in the flow diagrams and/or block diagrams and combinations of the flows and/or blocks in the flow diagrams and/or block diagrams may be implemented by computer program instructions. These computer program instructions may be provided for a general-purpose computer, a special-purpose computer, an embedded processor, or a processor of another programmable data processing device to generate a machine, such that the instructions executed by a computer or a processor of another programmable data processing device generate an apparatus for implementing a specific function in one or more processes in the flowcharts and/or in one or more blocks in the block diagrams. These computer program instructions may be stored in a computer readable memory that may instruct the computer or another programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams. These computer program instructions may be loaded onto a computer or another programmable data processing device, such that a series of operations and steps are executed on the computer or another programmable device, thereby ensuring computer-implemented processing. Therefore, the instructions executed on the computer or another programmable device provide steps for implementing a specific function in one or more processes in the flow charts and/or in one or more blocks in the block diagrams.

What is described above is merely the preferred implementation of the present disclosure, the scope of protection of the present disclosure is not limited to the above embodiments, and all technical solutions following the idea of the present disclosure fall within the scope of protection of the present disclosure. It should be noted that several modifications and adaptations made by those of ordinary skill in the art without departing from the principle of the present disclosure should fall within the scope of protection of the present disclosure.

What is claimed is:
1. A three-dimensional (3D) structured light camera based method for measuring a gap of a vehicle body, comprising:
1) obtaining point cloud data obtained by a 3D structured light camera scanning a gap of a measured vehicle body;
2) with a group of point cloud data of the gap of the measured vehicle body in a transverse direction as a contour, extracting contour gap points of each contour to obtain a left side contour gap point set $N_0$ and a right side contour gap point set $N_1$;
3) computing a mean distance vector $\vec{\tau}$ between contours on two sides of the gap of the measured vehicle body according to the left side contour gap point set $N_0$ and the right side contour gap point set $N_1$; and

4) computing the gap d of the measured vehicle body according to the mean distance vector $\vec{\tau}$;

wherein before the extracting the contour gap points of each of contours in step 2), the method further comprises: filtering discrete point clouds of each of the contours in the point cloud data; and after step 2) and before step 3), the method further comprises: fitting straight lines on the left side contour gap point set $N_0$ and the right side contour gap point set $N_1$ respectively to obtain straight lines $L_0$ and $L_1$, and deleting discrete contour gap points in the left side contour gap point set $N_0$ and the right side contour gap point set $N_1$ according to the straight lines $L_0$ and $L_1$.

2. The 3D structured light camera based method for measuring the gap of the vehicle body according to claim 1, wherein the 3D structured light camera in step 1) is a 3D line structured light camera or a 3D surface structured light camera; and when the 3D structured light camera is the 3D line structured light camera, the scanning the gap of the measured vehicle body by the 3D structured light camera refers to longitudinal scanning along the gap of the measured vehicle body, such that each frame of point cloud data of the 3D structured light camera comprises a contour.

3. The 3D structured light camera based method for measuring the gap of the vehicle body according to claim 1, wherein step 2) comprises:

2.1) clustering the point cloud data to obtain a left side cluster point cloud set and a right side cluster point cloud set;

2.2) carrying out traversal from the left side cluster point cloud set and the right side cluster point cloud set to take a contour as a current contour with a group of point cloud data of the gap of the measured vehicle body in the transverse direction as a contour, and under the condition that traversal succeeds, skipping to a next step; and under the condition that traversal fails, determining that the left side cluster point cloud set and the right side cluster point cloud set have been completely traversed, returning to the left side contour gap point set $N_0$ and the right side contour gap point set $N_1$, and skipping to step 3); and 2.3) positioning contour gap points in the current contour, under the condition that the current contour is a contour in the left side cluster point cloud set, adding contour gap points of the current contour into the left side contour gap point set $N_0$, and under the condition that the current contour is a contour in the right side cluster point cloud set, adding the contour gap points of the current contour into the right side contour gap point set $N_1$, and skipping to step 2.2).

4. The 3D structured light camera based method for measuring the gap of the vehicle body according to claim 3, wherein finding the contour gap points of the current contour in step 2.3) comprises: computing a cosine curvature of each of points on the current contour, and taking a point having a maximum cosine curvature in the current contour as the contour gap point of the current contour.

5. The 3D structured light camera based method for measuring the gap of the vehicle body according to claim 1, wherein step 3) comprises: traversing each of the contour gap points qi in the left side contour gap point set $N_0$, searching the contour gap points pi closest to the contour gap points qi in the right side contour gap point set $N_1$ as the closest contour gap point pairs for the contour gap points qi obtained by traversing, and computing mean distance vectors of the closest contour gap point pairs; and averaging the mean distance vectors of all the closest contour gap point pairs to obtain the mean distance vector $\vec{\tau}$ between the contours on the two sides of the gap of the measured vehicle body.

6. The 3D structured light camera based method for measuring the gap of the vehicle body according to claim 5, wherein a function expression of the gap d of the measured vehicle body computed according to the mean distance vector $\vec{\tau}$ in step 4) is:

$$d=|\vec{\tau}|\cos\theta,$$

wherein $\vec{\tau}$ is the mean distance vector between the contours on the two sides of the gap of the measured vehicle body, and θ is an included angle between the mean distance vector $\vec{\tau}$ between the contours on the two sides of the gap of the measured vehicle body after being projected to an xz plane and an x-axis direction, wherein the x-axis direction is a direction perpendicular to the gap, a y-axis direction is a direction parallel to the gap, and a z-axis direction is perpendicular to a direction that the gap faces.

7. The 3D structured light camera based method for measuring the gap of the vehicle body according to claim 1, wherein after step 2), the method further comprises: computing a surface difference of the gap of the measured vehicle body, comprising:

S1) finding a contour gap point corresponding to an x-axis minimum value from the left side contour gap point set $N_0$, finding a contour gap point corresponding to an x-axis maximum value from the right side contour gap point set $N_1$, and marking a region of interest (ROT) with the contour gap point corresponding to the x-axis minimum value and the contour gap point corresponding to the x-axis maximum value as reference points; and S2) obtaining contour gap points belonging to the ROT in the left side contour gap point set $N_0$ and the right side contour gap point set $N_1$ to obtain a surface difference point cloud set, and extracting planes on a basis of the surface difference point cloud set to obtain a left side plane and a right side plane respectively; and for the left side plane and the right side plane, with one side plane as a reference plane, solving a center of mass of the other side plane as a measurement point to compute a distance between the measurement point and the reference plane as a surface difference computation result of the gap of the measured vehicle body.

8. A 3D structured light camera based system for measuring a gap of a vehicle body, comprising a microprocessor and a non-transitory memory connected to each other, wherein the microprocessor is programmed or configured to execute steps of the 3D structured light camera based method for measuring the gap of the vehicle body of claim 1.

9. The 3D structured light camera based system for measuring the gap of the vehicle body according to claim 8, wherein the 3D structured light camera in step 1) is a 3D line structured light camera or a 3D surface structured light camera; and when the 3D structured light camera is the 3D line structured light camera, the scanning the gap of the measured vehicle body by the 3D structured light camera refers to longitudinal scanning along the gap of the measured vehicle body, such that each frame of point cloud data of the 3D structured light camera comprises a contour.

10. The 3D structured light camera based system for measuring the gap of the vehicle body according to claim 8, wherein step 2) comprises:
  2.1) clustering the point cloud data to obtain a left side cluster point cloud set and a right side cluster point cloud set;
  2.2) carrying out traversal from the left side cluster point cloud set and the right side cluster point cloud set to take a contour as a current contour with a group of point cloud data of the gap of the measured vehicle body in the transverse direction as a contour, and under the condition that traversal succeeds, skipping to a next step; and under the condition that traversal fails, determining that the left side cluster point cloud set and the right side cluster point cloud set have been completely traversed, returning to the left side contour gap point set $N_0$ and the right side contour gap point set $N_1$, and skipping to step 3); and
  2.3) positioning contour gap points in the current contour, under the condition that the current contour is a contour in the left side cluster point cloud set, adding contour gap points of the current contour into the left side contour gap point set $N_0$, and under the condition that the current contour is a contour in the right side cluster point cloud set, adding the contour gap points of the current contour into the right side contour gap point set $N_1$, and skipping to step 2.2).

11. The 3D structured light camera based system for measuring the gap of the vehicle body according to claim 10, wherein finding the contour gap points of the current contour in step 2.3) comprises: computing a cosine curvature of each of points on the current contour, and taking a point having a maximum cosine curvature in the current contour as the contour gap point of the current contour.

12. The 3D structured light camera based system for measuring the gap of the vehicle body according to claim 8, wherein step 3) comprises: traversing each of the contour gap points qi in the left side contour gap point set $N_0$, searching the contour gap points pi closest to the contour gap points qi in the right side contour gap point set $N_1$ as the closest contour gap point pairs for the contour gap points qi obtained by traversing, and computing mean distance vectors of the closest contour gap point pairs; and averaging the mean distance vectors of all the closest contour gap point pairs to obtain the mean distance vector $\vec{\tau}$ between the contours on the two sides of the gap of the measured vehicle body.

13. The 3D structured light camera based system for measuring the gap of the vehicle body according to claim 12, wherein a function expression of the gap d of the measured vehicle body computed according to the mean distance vector $\vec{\tau}$ in step 4) is:

$$d=|\vec{\tau}|\cos\theta,$$

wherein $\vec{\tau}$ is the mean distance vector between the contours on the two sides of the gap of the measured vehicle body, and θ is an included angle between the mean distance vector $\vec{\tau}$ between the contours on the two sides of the gap of the measured vehicle body after being projected to an xz plane and an x-axis direction, wherein the x-axis direction is a direction perpendicular to the gap, a y-axis direction is a direction parallel to the gap, and a z-axis direction is perpendicular to a direction that the gap faces.

14. The 3D structured light camera based system for measuring the gap of the vehicle body according to claim 8, wherein after step 2), the method further comprises: computing a surface difference of the gap of the measured vehicle body, comprising:
  S1) finding a contour gap point corresponding to an x-axis minimum value from the left side contour gap point set $N_0$, finding a contour gap point corresponding to an x-axis maximum value from the right side contour gap point set $N_1$, and marking a region of interest (ROI) with the contour gap point corresponding to the x-axis minimum value and the contour gap point corresponding to the x-axis maximum value as reference points; and
  S2) obtaining contour gap points belonging to the ROI in the left side contour gap point set $N_0$ and the right side contour gap point set $N_1$ to obtain a surface difference point cloud set, and extracting planes on a basis of the surface difference point cloud set to obtain a left side plane and a right side plane respectively; and for the left side plane and the right side plane, with one side plane as a reference plane, solving a center of mass of the other side plane as a measurement point to compute a distance between the measurement point and the reference plane as a surface difference computation result of the gap of the measured vehicle body.

15. A non-transitory computer readable storage medium, storing a computer program, wherein the computer program is used for being executed by a computer device to implement steps of the 3D structured light camera based method for measuring the gap of the vehicle body of claim 1.

16. The non-transitory computer readable storage medium according to claim 15, wherein the 3D structured light camera in step 1) is a 3D line structured light camera or a 3D surface structured light camera; and when the 3D structured light camera is the 3D line structured light camera, the scanning the gap of the measured vehicle body by the 3D structured light camera refers to longitudinal scanning along the gap of the measured vehicle body, such that each frame of point cloud data of the 3D structured light camera comprises a contour.

17. The non-transitory computer readable storage medium according to claim 15, wherein step 2) comprises:
  2.1) clustering the point cloud data to obtain a left side cluster point cloud set and a right side cluster point cloud set;
  2.2) carrying out traversal from the left side cluster point cloud set and the right side cluster point cloud set to take a contour as a current contour with a group of point cloud data of the gap of the measured vehicle body in the transverse direction as a contour, and under the condition that traversal succeeds, skipping to a next step; and under the condition that traversal fails, determining that the left side cluster point cloud set and the right side cluster point cloud set have been completely traversed, returning to the left side contour gap point set $N_0$ and the right side contour gap point set $N_1$, and skipping to step 3); and
  2.3) positioning contour gap points in the current contour, under the condition that the current contour is a contour in the left side cluster point cloud set, adding contour gap points of the current contour into the left side contour gap point set $N_0$, and under the condition that the current contour is a contour in the right side cluster point cloud set, adding the contour gap points of the current contour into the right side contour gap point set $N_1$, and skipping to step 2.2).

18. The non-transitory computer readable storage medium according to claim 17, wherein finding the contour gap points of the current contour in step 2.3) comprises: computing a cosine curvature of each of points on the current contour, and taking a point having a maximum cosine curvature in the current contour as the contour gap point of the current contour.

* * * * *